United States Patent
Weng et al.

(10) Patent No.: US 10,860,839 B2
(45) Date of Patent: Dec. 8, 2020

(54) METHOD AND APPARATUS FOR GENERATING TRAINING DATA FOR HUMAN FACE RECOGNITION, DEVICE AND COMPUTER STORAGE MEDIUM

(71) Applicant: BAIDU ONLINE NETWORK TECHNOLOGY (BEIJING) CO., LTD., Haidian District Beijing (CN)

(72) Inventors: Renliang Weng, Haidian District Beijing (CN); Tao He, Haidian District Beijing (CN); Gang Zhang, Haidian District Beijing (CN); Jingtuo Liu, Haidian District Beijing (CN); Wenxian Liu, Haidian District Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 253 days.

(21) Appl. No.: 16/103,122

(22) Filed: Aug. 14, 2018

(65) Prior Publication Data
US 2019/0050632 A1  Feb. 14, 2019

(30) Foreign Application Priority Data
Aug. 14, 2017 (CN) .......................... 2017 1 0691048.5

(51) Int. Cl.
*G06K 9/00* (2006.01)
*G06N 3/04* (2006.01)
(Continued)

(52) U.S. Cl.
CPC .......... *G06K 9/00288* (2013.01); *G06F 17/15* (2013.01); *G06K 9/6267* (2013.01);
(Continued)

(58) Field of Classification Search
None
See application file for complete search history.

(56) References Cited

U.S. PATENT DOCUMENTS 8,879,804 B1 * 11/2014 Konoplev .......... G06K 9/00281
382/118
2017/0351935 A1 * 12/2017 Liu ...................... G06K 9/6256

OTHER PUBLICATIONS

Liu et al., "Coupled Generative Adversarial Networks", 29th Conference on Neural Information Processing Systems (NIPS 2016), Sep. 20, 2016 (Year: 2016).*

* cited by examiner

*Primary Examiner* — Matthew C Bella
*Assistant Examiner* — Brian D Shin
(74) *Attorney, Agent, or Firm* — Brooks Kushman PC (57) ABSTRACT

The present disclosure provides a method and apparatus for generating training data for human face recognition, a device and a computer storage medium, wherein the method comprises: inputting accessory-not-worn face images into a generative network, to obtain accessory-worn face images; using the accessory-worn face images as second training data for building the human face recognition model; wherein the generative network is a generative network in a generative adversarial network obtained by pre-training with first training data, the first training data including the accessory-not-worn face images and accessory-worn face images corresponding to a same user identifier. In the present disclosure, the accessory-worn face images obtained in a data augmentation manner greatly expand the amount of training data for building the human face recognition model, and thereby improve the recognition accuracy of the accessory-worn face images.

9 Claims, 4 Drawing Sheets

(51) Int. Cl.
*G06K 9/62* (2006.01)
*G06F 17/15* (2006.01)
*G06K 9/66* (2006.01)
*G06N 20/00* (2019.01)
*G06N 3/08* (2006.01)
G06N 7/00 (2006.01)
G06N 20/10 (2019.01)

(52) U.S. Cl.
CPC ............ *G06K 9/66* (2013.01); *G06N 3/0454* (2013.01); *G06N 3/0472* (2013.01); *G06N 3/08* (2013.01); *G06N 20/00* (2019.01); *G06N 7/005* (2013.01); *G06N 20/10* (2019.01)

METHOD AND APPARATUS FOR GENERATING TRAINING DATA FOR HUMAN FACE RECOGNITION, DEVICE AND COMPUTER STORAGE MEDIUM

The present application claims the priority of Chinese Patent Application No. 201710691048.5, filed on Aug. 14, 2017, with the title of "Method and apparatus for generating training data for human face recognition, device and computer storage medium". The disclosure of the above applications is incorporated herein by reference in its entirety.

FIELD OF THE DISCLOSURE

The present disclosure relates to the technical field of computer application, and particularly to a method and apparatus for generating training data for human face recognition, a device and a computer storage medium.

BACKGROUND OF THE DISCLOSURE

Human face recognition is a biological recognition technology of performing identity recognition based on human facial feature information. Human face recognition products are already widely applied to fields such as finance, judicature, troops, public security, frontier inspection, government, aerospace, electric power, factories, education, medical care and many enterprises sand institutions. As the technology further gets mature and a social recognition degree improves, human face recognition technology will be applied to more fields.

Currently most human face recognition has higher requirements for human face images, and exhibits an undesirable recognition accuracy of accessory-worn face images, for example, wearing glasses, a cap, a mask or the like to cover the face. However, some specific fields such as judicature, troops, public security and frontier inspection usually have higher accuracy requirements for accessory-worn human face recognition. For example, a camera captures that a person wearing a mask is committing a crime, and it is necessary to recognize the camera-captured mask wearer's face images. However, currently the accuracy of recognizing such images is very poor. In the final analysis, a reason for very poor accuracy of such recognition lies in insufficient training data. A lot of accessory-not-worn face images can be obtained as training data, but accessory-worn face images are in a small number and are unlikely to be used to train an accurate human face recognition model.

SUMMARY OF THE DISCLOSURE

In view of the above, the present disclosure provides a method and apparatus for generating training data for human face recognition, a device and a computer storage medium, to improve the recognition accuracy of the accessory-worn face images.

Specific technical solutions are as follows:

The present disclosure further provides a method of generating training data for human face recognition, the method comprising:

inputting accessory-not-worn face images into a generative network, to obtain accessory-worn face images;

using the accessory-worn face images as second training data for building the human face recognition model;

wherein the generative network is a generative network in a generative adversarial network obtained by pre-training with first training data, the first training data including the accessory-not-worn face images and accessory-worn face images corresponding to a same user identifier.

According to a preferred implementation mode of the present disclosure, the accessory comprises glasses, a mask or a cap.

According to a preferred implementation mode of the present disclosure, pre-training the generative adversarial network comprises:

obtaining first training data which include the accessory-not-worn face images and accessory-worn face images corresponding to the same user identifier;

training the generative adversarial network by regarding the accessory-not-worn face images and accessory-worn face images corresponding to the same user identifier respectively as input of a generative network and a discriminative network in the generative adversarial network.

According to a preferred implementation mode of the present disclosure, during the training of the generative adversarial network, a training target of the generative network is to maximize similarity between the accessory-worn face image generated by generative network and the accessory-worn face image corresponding to the same user identifier in the first training data;

a training target of the discriminative network is to maximize discrimination between the accessory-worn face image generated by generative network and the accessory-worn face image corresponding to the same user identifier in the first training data;

fixing one of the generative network and the discriminative network, and using the training target of the other network to train the other network, alternatingly and iteratively, until Nash Equilibrium is achieved or preset alternating iteration times are reached.

According to a preferred implementation mode of the present disclosure, the fixing one of the generative network and the discriminative network, and using the training target of the other network to train the other network, alternatingly and iteratively, comprises:

when the generative network is fixed, using a value of a loss function to adjust parameters of the discriminative network to maximize the loss function; when the discriminative network is fixed, using the value of the loss function to adjust parameters of the generative network to minimize the loss function; performing alternating iteration in the manner;

wherein the loss function Loss includes:

$$\text{Loss} = \sum_i \log(d_i) - \sum_j \log(g_j)$$

where $d_i$ is a confidence of the accessory-worn face image corresponding to the user identifier i in the first training data, $g_j$ is a confidence of the accessory-worn face image corresponding to the user identifier j generated by the generative network, and the $d_i$ and $g_j$ are obtained from output of the discriminative network.

The present disclosure further provides an apparatus of generating training data for human face recognition, the apparatus comprising:

a generating unit configured to input accessory-not-worn face images into a generative network, to obtain accessory-worn face images;

a providing unit configured to use the accessory-worn face images as second training data for building the human face recognition model;

wherein the generative network is a generative network in a generative adversarial network obtained by pre-training with first training data, the first training data including the accessory-not-worn face images and accessory-worn face images corresponding to a same user identifier.

According to a preferred implementation mode of the present disclosure, the accessory comprises glasses, a mask or a cap.

According to a preferred implementation mode of the present disclosure, the apparatus further comprise:

a training unit configured to pre-train the generative adversarial network in the following manner:

obtaining first training data which include the accessory-not-worn face images and accessory-worn face images corresponding to the same user identifier;

training the generative adversarial network by regarding the accessory-not-worn face images and accessory-worn face images corresponding to the same user identifier respectively as input of a generative network and a discriminative network in the generative adversarial network.

According to a preferred implementation mode of the present disclosure, the training unit is configured in a way that during the training of the generative adversarial network, a training target of the generative network is to maximize similarity between the accessory-worn face image generated by generative network and the accessory-worn face image corresponding to the same user identifier in the first training data;

a training target of the discriminative network is to maximize discrimination between the accessory-worn face image generated by generative network and the accessory-worn face image corresponding to the same user identifier in the first training data;

one of the generative network and the discriminative network is fixed, the training target of the other network is used to train the other network, alternatingly and iteratively, until Nash Equilibrium is achieved or preset alternating iteration times are reached.

According to a preferred implementation mode of the present disclosure, the training unit specifically performs:

when the generative network is fixed, use a value of a loss function to adjust parameters of the discriminative network to maximize the loss function; when the discriminative network is fixed, use the value of the loss function to adjust parameters of the generative network to minimize the loss function; perform alternating iteration in the manner until Nash Equilibrium is achieved or preset alternating iteration times are reached;

wherein the loss function Loss includes:

$$\text{Loss} = \sum_i \log(d_i) - \sum_j \log(g_j)$$

where $d_i$ is a confidence of the accessory-worn face image corresponding to the user identifier i in the first training data, $g_j$ is a confidence of the accessory-worn face image corresponding to the user identifier j generated by the generative network, and the $d_i$ and $g_j$ are obtained from output of the discriminative network.

The present disclosure further provides a device, the device comprising:
one or more processors,
a storage for storing one or more programs, the one or more programs, when executed by said one or more processors, enable said one or more processors to implement the above-mentioned method.

The present disclosure further provides a storage medium containing computer executable instructions, wherein the computer executable instructions, when executed by a computer processor, implement the above-mentioned method.

As can be seen from the above technical solutions, in the present disclosure, a lot of already-existing accessory-not-worn face images are used to generate the accessory-worn face images which are used as training data for building a human face recognition model. The accessory-worn face images obtained in a data augmentation manner greatly expand the amount of training data for building the human face recognition model, solve the problem about scarcity of accessory-worn face images, and improve the recognition accuracy of the accessory-worn face images.

DETAILED DESCRIPTION OF PREFERRED EMBODIMENTS

The present disclosure will be described in detail in conjunction with figures and specific embodiments to make objectives, technical solutions and advantages of the present disclosure more apparent.

Since a lot of accessory-not-worn face images can be obtained, a core idea of the present disclosure lies in using a lot of already-existing accessory-not-worn face images to obtain an accessory-wearer's face images, and regarding them as training data for training a human face recognition model. However, when accessory-not-worn face images are used to obtain an accessory-wearer's face images, a target is to try to make the obtained accessory-wearer's face images similar to real accessory-wearer's face images as much possible. The method according to the present disclosure will be described in detail below with reference to embodiments.

In the present disclosure, training data for building a human face recognition model are generated through a generation network. The generation network belongs to Generative Adversarial Networks (GAN). Therefore, the present disclosure involves two processes: a GAN-training process and a process of using a generation network in GAN to generate training data. In the embodiment of the present disclosure, to distinguish training data used for training the GAN from the training data generated by using the generation network in the GAN, the former is called first training data and the latter is called second training data.

Figure 1:
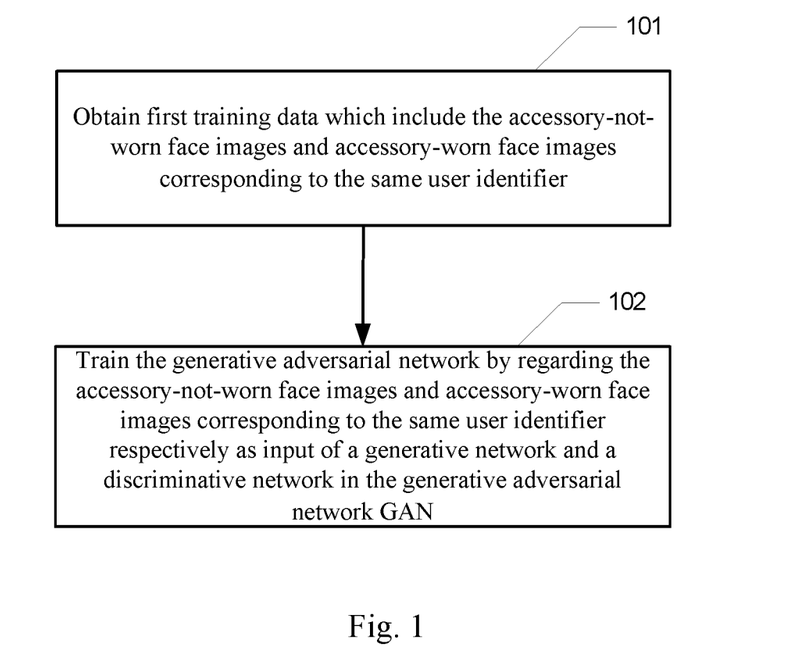
FIG. 1 is a flow chart of a method of training generative adversarial network according to an embodiment of the present disclosure.

To facilitate understanding of the present disclosure, the GAN-training process is described in detail first. Referring to FIG. 1, the GAN-training process may comprise the following steps:

In 101 is obtained first training data which includes accessory-not-worn face images and accessory-worn face images corresponding to the same user identifier.

First, it is necessary to obtain accessory-not-worn face images and accessory-worn face images corresponding to a known user identifier, as training data used for training the GAN. The amount of this portion of data is usually such smaller than the amount of training data used for training the human face recognition model.

Additionally, it needs to be appreciated that different GANs need to be trained for different accessories. That is to say, when a GAN for a certain accessory is trained, the first training data to be obtained include accessary-worn face images. For example, when a GAN is trained for glasses, it is necessary to obtain glasses-worn face images and glasses-not-worn face images corresponding to the same user identifier. When a GAN is trained for a mask, it is necessary to obtain mask-worn face images and mask-not-worn face images corresponding to the same user identifier. When a GAN is trained for a cap, it is necessary to obtain cap-worn face images and cap-not-worn face images corresponding to the same user identifier.

In addition, in the first training data, the accessory-not-worn face images are preferably face images of a person not wearing any accessary.

102 relates to training the genitive adversarial network by regarding the accessory-not-worn face images and accessory-worn face images corresponding to the same user identifier are respectively as input of a generative network and a discriminative network in the GAN.

Figure 2:
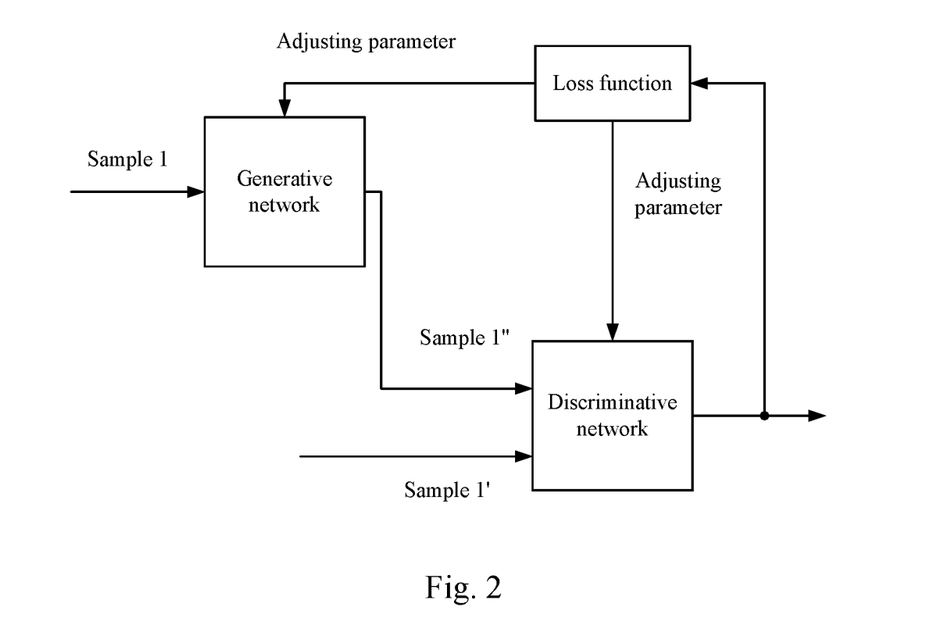
FIG. 2 is a structural schematic diagram of a generative adversarial network according to an embodiment of the present disclosure.

First, the structure of the GAN is introduced briefly. The GAN mainly comprises two networks: a generative network (G network) and a discriminative network (D network). In the generative network, a sample 1" is generated from input sample 1, and its target is make the generated sample 1" close to a sample 1' as much as possible, wherein the sample 1' is a "real" sample. A target of the discriminative network is trying to discriminate sample 1' from sample 1", namely, discriminate "authenticity" of a sample to figure out whether the sample is the sample generated by the generative network or a "real" sample. During the training of GAN, one of the generative network and the discriminative network is fixed, then a training target of the other network is used to train the other network, alternatingly and iteratively. During alternating iteration, both parties try to optimize their own networks, thereby forming competitive adversary until both parties reach a dynamic equilibrium, namely, Nash Equilibrium, whereupon the GAN training is completed. After completion of the training, the generative network tries to create a sample identical with sample 1', the discriminative network fails to discriminate a correct result, the probability of correctness is 50%, something like guessing widely.

In the embodiment of the present disclosure, the aforesaid sample 1 and sample 1' respectively correspond to the accessory-not-worn face image and accessory-worn face image corresponding to the same user identifier in the first training data, sample 1" is an accessory-worn face image generated by the generative network according to the accessory-not-worn face image, and its target is to enable the generated accessory-worn face image to try to be similar to the accessory-worn face image (a real accessory-worn face image) corresponding to the same user identifier in the first training data, namely, maximize similarity between the accessory-worn face image generated by generative network and the accessory-worn face image corresponding to the same user identifier in the first training data. The training target of the discriminative network is trying to discriminate the accessory-worn face image generated by generative network from the real accessory-worn face image, namely, maximize the discrimination between the accessory-worn face image generated by generative network and the accessory-worn face image corresponding to the same user identifier in the first training data.

In the embodiment of the present disclosure, a loss function may be employed to achieve the abovementioned alternating iteration. When the generative network is fixed, a value of the loss function is used to adjust parameters of the discriminative network to maximize the loss function; when the discriminative network is fixed, the value of the loss function is used to adjust parameters of the generative network to minimize the loss function, thereby performing alternating iteration.

The loss function may employ but not limited to the following equation:

$$\text{Loss} = \sum_i \log(d_i) - \sum_j \log(g_j)$$

where $d_i$ is a confidence of the accessory-worn face image corresponding to the user identifier i in the first training data, $g_j$ is a confidence of the accessory-worn face image corresponding to the user identifier j generated by the generative network, and the $d_i$ and $g_j$ are obtained from output of the discriminative network.

The abovementioned generative network may employ but is not limited to HMM (Hidden Markov Model), Naive Bayes model, GMM (Gaussian Mixture Model), and LDA (Linear Discriminant Analysis). The discriminative model may employ but is not limited to linear regression model, LDA (Linear Discriminant Analysis), SVM (Support Vector Machine), and neural network.

After completion of the training of the GAN, the generative network in the GAN is obtained, and the generative network is used to generate the second training data employed by the human face recognition model.

Figure 3:
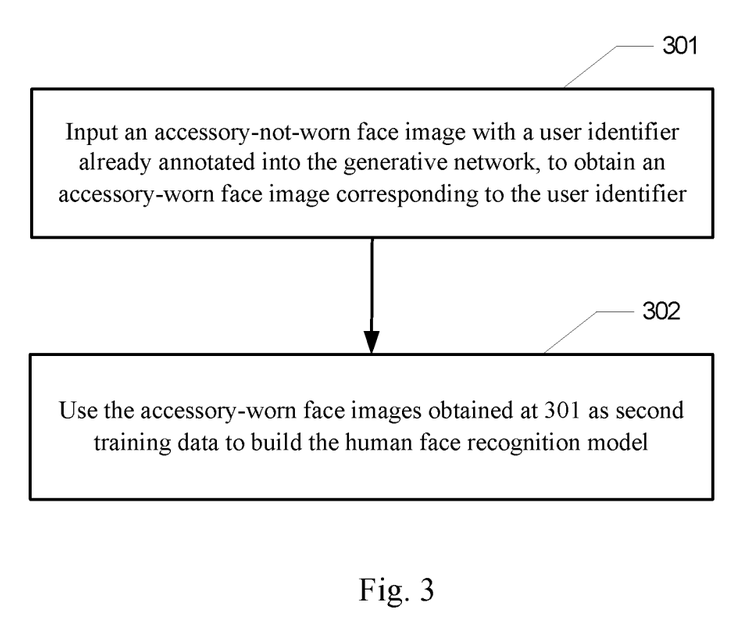
FIG. 3 is a flow chart of a method of generating training data for human face recognition according to an embodiment of the present disclosure.

FIG. 3 is a flow chart of a method of generating training data for human face recognition according to an embodiment of the present disclosure. As shown in FIG. 3, the method may comprise the following steps:

At 301, input an accessory-not-worn face image with a user identifier already annotated into the generative network, to obtain an accessory-worn face image corresponding to the user identifier.

The step is in fact a process of using a lot already-existing accessory-not-worn face image to generate the accessory-worn face image. Through the GAN training process in the flow shown in FIG. 1, the generative network in the GAN already learns accessory-worn feature distribution very well to generate the accessory-worn face image on the basis of accessory-not-worn face image.

For example, it is possible to input the accessory-not-worn face image of a certain user into the generative network corresponding to the glasses, to generate a glasses-worn face image of the user on the basis of accessory-not-worn face image. Again for example, it is possible to input the accessory-not-worn face image of a certain user into the generative network corresponding to a mask, to generate a mask-worn face image of the user on the basis of accessorynot-worn face image. Again for example, it is possible to input the accessory-not-worn face image of a certain user into the generative network corresponding to a cap, to generate a cap-worn face image on the basis of accessory-not-worn face image.

At 302, use the accessory-worn face images obtained at 301 as second training data to build the human face recognition model.

In the embodiment of the present disclosure, it is possible to, upon building the human face recognition model, regard accessory-worn face images with user identifiers annotated respectively, as the training data of the human face recognition model, and the training data may also include accessory-not-worn face images.

The process of building the human face recognition model is not limited in the present disclosure. After the second training data are obtained in the manner provided in the present disclosure, it is feasible to train in any implementable model training manner based on the second training data to obtain the human face recognition model. The number of accessory-worn face images is substantially increased in a data augmentation manner, so the human face recognition model obtained by training by using them as the training data is used to perform more accurate recognition for the accessory-worn face.

The above describes the method according to the present disclosure in detail. The apparatus according to the present disclosure will be described in detail in conjunction with an embodiment.

Figure 4:
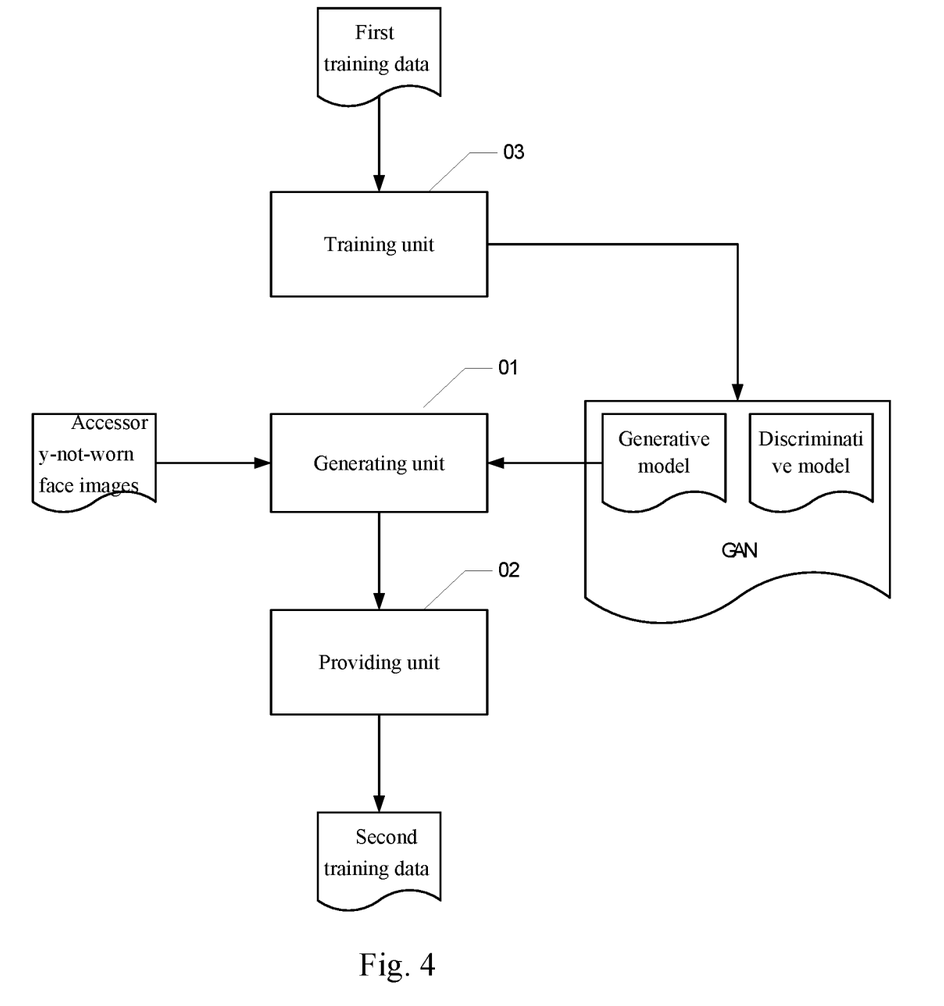
FIG. 4 is a structural schematic diagram of an apparatus of generating training data for human face recognition according to an embodiment of the present disclosure.

FIG. 4 is a structural schematic diagram of an apparatus of generating training data for human face recognition according to an embodiment of the present disclosure. As shown in FIG. 4, the apparatus may comprise: a generating unit 01 and a providing unit 02, and further comprise a training unit 03. Main functions of the units are as follows:

First, the training unit 03 is introduced, and it is responsible for pre-training a GAN. Specifically, it is possible to first obtain first training data which includes accessory-not-worn face images and accessory-worn face images corresponding to the same user identifier; then training the GAN by regarding the accessory-not-worn face images and accessory-worn face images corresponding to the same user identifier respectively as input of a generative network and a discriminative network in the GAN.

The training unit 03 is configured in a way that during the training of the GAN, a training target of the generative network is to maximize similarity between the accessory-worn face image generated by generative network and the accessory-worn face image corresponding to the same user identifier in the first training data; a training target of the discriminative network is to maximize the discrimination between the accessory-worn face image generated by generative network and the accessory-worn face image corresponding to the same user identifier in the first training data. One of the generative network and the discriminative network is fixed, then the training target of the other network is used to train the other network, alternatingly and iteratively, until Nash Equilibrium is achieved or preset alternating iteration times are reached.

The training unit 03 is configured to, when the generative network is fixed, use a value of a loss function to adjust parameters of the discriminative network to maximize the loss function; when the discriminative network is fixed, use the value of the loss function to adjust parameters of the generative network to minimize the loss function; perform alternating iteration in the manner until Nash Equilibrium is achieved or preset alternating iteration times are reached.

The loss function Loss may employ but is not limited to the following equation:

$$\text{Loss} = \sum_i \log(d_i) - \sum_j \log(g_j)$$

where $d_i$ is a confidence of the accessory-worn face image corresponding to the user identifier i in the first training data, $g_j$ is a confidence of the accessory-worn face image corresponding to the user identifier j generated by the generative network, and the $d_i$ and $g_j$ are obtained from output of the discriminative network.

The abovementioned generative network may employ but is not limited to HMM (Hidden Markov Model), Naive Bayes model, GMM (Gaussian Mixture Model), and LDA (Linear Discriminant Analysis). The discriminative model may employ but is not limited to linear regression model, LDA (Linear Discriminant Analysis), SVM (Support Vector Machine), and neural network.

The generating unit 01 is configured to input the accessory-not-worn face images into the generative network, to obtain accessory-worn face images. The generating unit 01 in fact uses a lot of already-existing accessory-not-worn face images (user identifiers already annotated) to generate the accessory-worn face image. Through the GAN training process of the training unit 03, the generative network in the GAN already learns accessory-worn feature distribution very well to generate the accessory-worn face images on the basis of accessory-not-worn face images.

The providing unit 02 is configured to use the accessory-worn face images as second training data for building the human face recognition model. It is possible to, upon building the human face recognition model, regard accessory-worn face images with user identifiers annotated respectively, as the training data of the human face recognition model, and the training data may also include accessory-not-worn face images.

The accessory involved in the present embodiment may include glasses, mask or cap. A corresponding GAN is trained with respect to a different type of accessory, and the GAN with respect to a corresponding type of accessory is used to generate the face images wherein this type of accessory is worn.

Several application scenarios are listed below:

Scenario 1: after a camera at a public site captures a crime suspect's face image, the identity of the crime suspect can be recognized accurately even though the crime suspect uses sunglasses, a mask or a cap to cover part of his face, thereby providing basis for cracking a criminal case in the fields such as judicature and public security.

Scenario 2: it is possible to, at sites such as airport or frontier inspection sites, use a camera to capture the user's face image to verify the user's identity. In the case that the user is wearing sunglasses, a mask or a cap, his identity can also be verified accurately without taking off the accessory. On the one hand, this improves the efficiency of sites such as airports and frontier inspection sites, and on the other hand, brings about convenience to the user and improves the user's experience.

Figure 5:
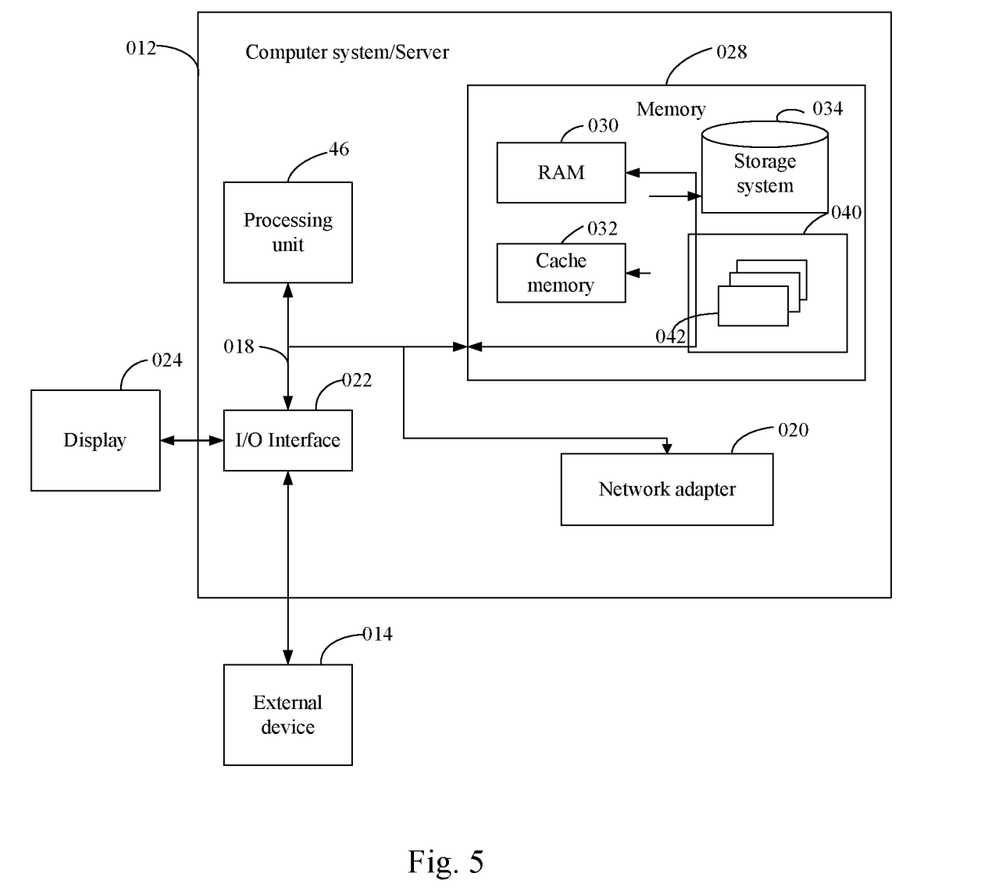
FIG. 5 illustrates a block diagram of an example computer system/server 012 adapted to implement an implementation mode of the present disclosure.

FIG. 5 illustrates a block diagram of an example computer system/server 012 adapted to implement an implementation mode of the present disclosure. The computer system/server 012 shown in FIG. 5 is only an example and should not bring about any limitation to the function and scope of use of the embodiments of the present disclosure.

As shown in FIG. 5, the computer system/server 012 is shown in the form of a general-purpose computing device. The components of computer system/server 012 may include, but are not limited to, one or more processors (processing units) 016, a system memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

The system memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 communicates with an external radar device, or with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via a network adapter 020. As depicted in the figure, network adapter 020 communicates with the other communication modules of computer system/server 012 via the bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the system memory 028, for example, implements the process as shown in FIG. 1 or FIG. 3.

The above-mentioned computer program may be disposed in a computer storage medium, i.e., the computer storage medium is encoded with a computer program. When the program, executed by one or more computers, enables said one or more computers to execute steps of methods and/or operations of apparatuses as shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a computer readable signal medium or a computer readable storage medium. A computer readable medium for example may include, but not limited to, an electronic, magnetic, optical, electromagnetic, infrared, or semiconductor system, apparatus, or device, or any suitable combination of the foregoing. More specific examples (non-exhaustive listing) of the computer readable storage medium would include an electrical connection having one or more conductor wires, a portable computer magnetic disk, a hard disk, a random access memory (RAM), a read-only memory (ROM), an erasable programmable read-only memory (EPROM or Flash memory), optical fiber, a portable compact disc read-only memory (CD-ROM), an optical storage device, a magnetic storage device, or any suitable combination of the foregoing. In the text herein, the computer readable storage medium can be any tangible medium that includes or stores a program. The program may be used by an instruction execution system, apparatus or device or used in conjunction therewith.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method of generating training data for human face recognition, wherein the method comprises:
   inputting accessory-not-worn face images into a generative network, to obtain accessory-worn face images; and
   using the accessory-worn face images as second training data for building human face recognition model;
   wherein the generative network is a generative network in a generative adversarial network obtained by pre-training with first training data, the first training data including the accessory-not-worn face images and accessory-worn face images corresponding to a same user identifier,
   wherein pre-training the generative adversarial network comprises:
   obtaining first training data which include the accessory-not-worn face images and accessory-worn face images corresponding to the same user identifier; and
   training the generative adversarial network by regarding the accessory-not-worn face images and accessory-worn face images corresponding to the same user identifier respectively as input of a generative network and a discriminative network in the generative adversarial network,
   wherein during the training of the generative adversarial network, a training target of the generative network is to maximize similarity between the accessory-worn face image generated by generative network and the accessory-worn face image corresponding to the same user identifier in the first training data;
   a training target of the discriminative network is to maximize discrimination between the accessory-worn face image generated by generative network and the accessory-worn face image corresponding to the same user identifier in the first training data;
   fixing one of the generative network and the discriminative network, and using the training target of the other network to train the other network, alternatingly and iteratively, until Nash Equilibrium is achieved or preset alternating iteration times are reached.

2. The method according to claim 1, wherein the accessory comprises glasses, a mask or a cap.

3. The method according to claim 1, wherein the fixing one of the generative network and the discriminative network, and using the training target of the other network to train the other network, alternatingly and iteratively, comprises:
   when the generative network is fixed, using a value of a loss function to adjust parameters of the discriminative network to maximize the loss function; when the discriminative network is fixed, using the value of the loss function to adjust parameters of the generative network to minimize the loss function; performing alternating iteration in the manner;
   wherein the loss function Loss includes:

$$\text{Loss} = \sum_i \log(d_i) - \sum_j \log(g_j)$$

where $d_i$ is a confidence of the accessory-worn face image corresponding to the user identifier i in the first training data, $g_j$ is a confidence of the accessory-worn face image corresponding to the user identified j generated by the generative network, and the $d_i$ and $g_j$ are obtained from output of the discriminative network.

4. A device, wherein the device comprises:
   one or more processors,
   a storage for storing one or more programs,
   the one or more programs, when executed by said one or more processors, enable said one or more processors to implement a method of generating training data for human face recognition, wherein the method comprises:
   inputting accessory-not-worn face images into a generative network, to obtain accessory-worn face images; and
   using the accessory-worn face images as second training data for building a human face recognition model;
   wherein the generative network is a generative network in a generative adversarial network obtained by pre-training with first training data, the first training data including the accessory-not-worn face images and accessory-worn face images corresponding to a same user identifier,
   wherein pre-training the generative adversarial network comprises:
   obtaining first training data which include the accessory-not-worn face images and accessory-worn face images corresponding to the same user identifier; and
   training the generative adversarial network by regarding the accessory-not-worn face images and accessory-worn face images corresponding, to the same user identifier respectively as input of a generative network and a discriminative network in the generative adversarial network,
   wherein during the training of the generative adversarial network, a training target of the generative network is to maximize similarity between the accessory-worn face image generated by generative network and the accessory-worn face image corresponding to the same user identifier in the first training data;
   a training target of the discriminative network is to maximize discrimination between the accessory-worn face image generated by generative network and the accessory-worn face image corresponding to the same user identifier in the first training data;
   fixing one of the generative network and the discriminative network, and using the training target of the other network to train the other network, alternatingly and iteratively until Nash Equilibrium is achieved or preset alternating iteration times are reached.

5. The device according to claim 4, wherein the accessory comprises glasses, a mask or a cap.

6. The device according to claim 4, wherein the fixing one of the generative network and the discriminative network, and using the training target of the other network to train the other network, alternatingly and iteratively, comprises:
when the generative network is fixed, using a value of a loss function to adjust parameters of the discriminative network to maximize the loss function; when the discriminative network is fixed, using the value of the loss function to adjust parameters of the generative network to minimize the loss function; performing alternating iteration in the manner;
wherein the loss function Loss includes:

$$Loss = \sum_i \log(d_i) - \sum_j \log(g_j)$$

where $d_i$ is a confidence of the accessory-worn face image corresponding to the user identifier i in the first training data, $g_j$ is a confidence of the accessory-worn face image corresponding to the user identified j generated by the generative network, and the $d_i$ and $g_j$ are obtained from output of the discriminative network.

7. A non-transitory computer readable storage medium containing computer executable instructions, wherein the computer executable instructions, when executed by a computer processor, implement a method of generating training data for human face recognition, wherein the method comprises:
inputting accessory-not-worn face images into a generative network, to obtain accessory-worn face images; and
using the accessory-worn face images as second training data for building human face recognition model;
wherein the generative network is a generative network in a generative adversarial network obtained by pre-training with first training data, the first training data including the accessory-not-worn face images and accessory-worn face images corresponding to a same user identifier,
wherein pre-training the generative adversarial network comprises:
obtaining first training data which include the accessory-not-worn face images and accessory-worn face images corresponding to the same user identifier; and
training the generative adversarial network by regarding the accessory-not-worn face images and accessory-worn face images corresponding to the same user identifier respectively as input of a generative network and a discriminative network in the generative adversarial network,
wherein during the training of the generative adversarial network, a training target of the generative network is to maximize similarity between the accessory-worn face image generated by generative network and the accessory-worn face image corresponding to the same user identifier in the first training data;
a training target of the discriminative network is to maximize discrimination between the accessory-worn face image generated b generative network and the accessory-worn face image corresponding to the same user identifier in the first training data;
fixing one of the generative network and the discriminative network, and using the training target of the other network to train the other network, alternatingly and iteratively, until Nash Equilibrium is achieved or preset alternating iteration times are reached.

8. The non-transitory computer readable storage medium according to claim 7, wherein the accessory comprises glasses, a mask or a cap.

9. The non-transitory computer readable storage medium according to claim 7, wherein the fixing one of the generative network and the discriminative network, and using the training target of the other network to train the other network, alternatingly and iteratively, comprises:
when the generative network is fixed, using a value of a loss function to adjust parameters of the discriminative network to maximize the loss function; when the discriminative network is fixed, using the value of the loss function to adjust parameters of the generative network to minimize the loss function; performing alternating iteration in the manner;
wherein the loss function Loss includes:

$$Loss = \sum_i \log(d_i) - \sum_j \log(g_j)$$

where $d_i$ is a confidence of the accessory-worn face image corresponding to the user identifier i in the first training data, $g_j$ is a confidence of the accessory-worn face image corresponding to the user identified j generated by the generative network, and the $d_i$ and $g_j$ are obtained from output of the discriminative network.

* * * * *

UNITED STATES PATENT AND TRADEMARK OFFICE
CERTIFICATE OF CORRECTION

PATENT NO. : 10,860,839 B2
APPLICATION NO. : 16/103122
DATED : December 8, 2020
INVENTOR(S) : Renliang Weng et al.

It is certified that error appears in the above-identified patent and that said Letters Patent is hereby corrected as shown below:

In the Specification

Column 14, Line 12, Claim 7:
After "face image generated"
Delete "b" and
Insert -- by --.

Signed and Sealed this
Second Day of August, 2022

Katherine Kelly Vidal
*Director of the United States Patent and Trademark Office*